Aug. 12, 1969  E. J. RUSLING ET AL  3,461,307
RADIATION SENSITIVE INTEGRATING DEVICE USING
SYNCHRONOUSLY DRIVEN ROTATING MEMBERS
Filed Jan. 14, 1965  2 Sheets-Sheet 1
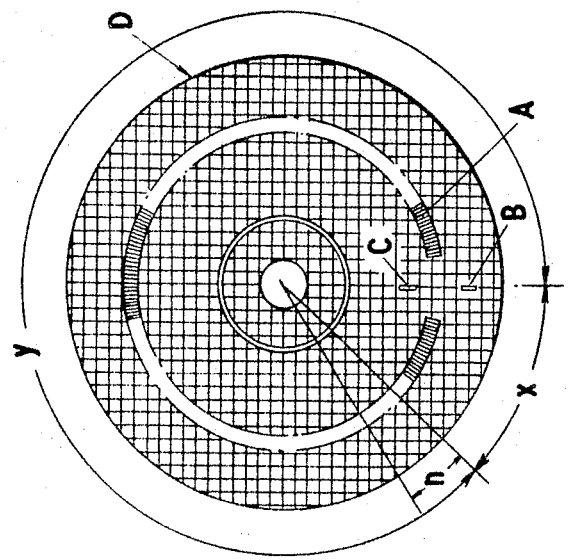
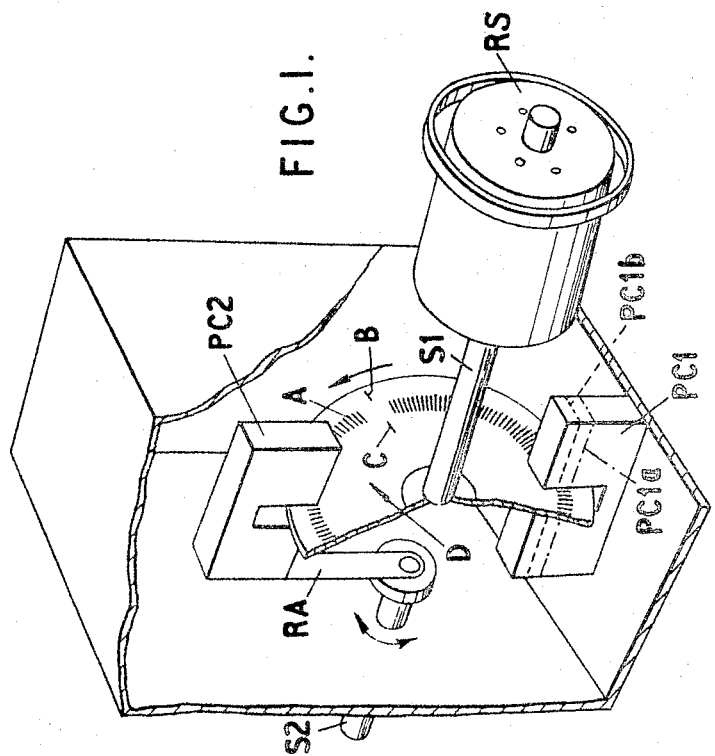
INVENTORS
ERIC JOHN RUSLING
EDWARD IVAN LOWE
BY
ATTORNEYS

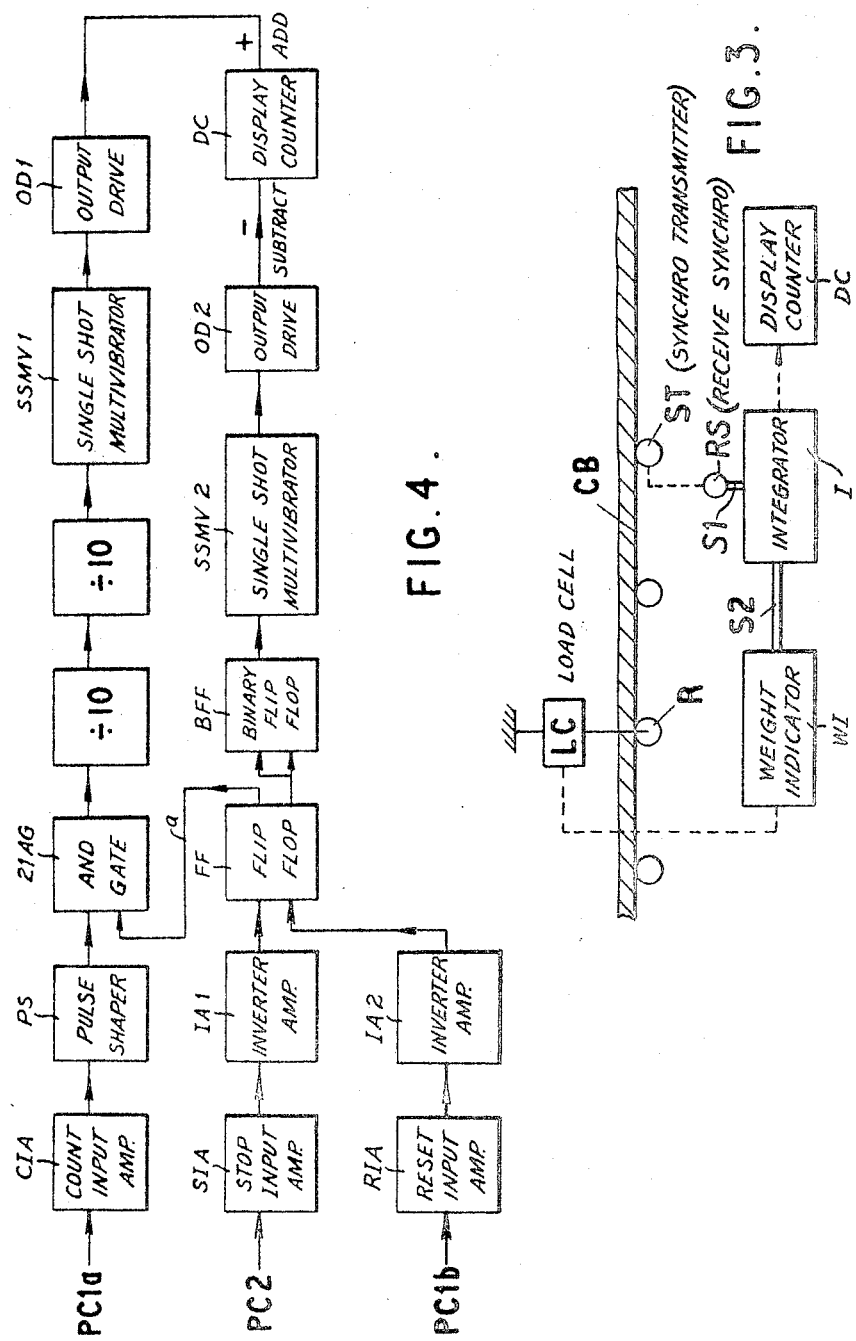

United States Patent Office 3,461,307
Patented Aug. 12, 1969

3,461,307
RADIATION SENSITIVE INTEGRATING DEVICE USING SYNCHRONOUSLY DRIVEN ROTATING MEMBERS
Eric John Rusling and Edward Ivan Lowe, Avonmouth, England, assignors to Imperial Smelting Corporation (N.S.C.) Limited (formerly The National Smelting Company Limited), London, England, a British company
Filed Jan. 14, 1965, Ser. No. 425,440
Claims priority, application Great Britain, Jan. 21, 1964, 2,648/64
Int. Cl. G01g 11/14; G01d 1/04, 5/36
U.S. Cl. 250—231     4 Claims

ABSTRACT OF THE DISCLOSURE

A rotating disc is driven in proportion to one variable to be integrated, and contains one track with marks to be counted and two markers located at different distances along a radial line. A first fixed sensing means registers the passage of the marks, and a second fixed sensing means responds to one of the markers to start the count. A movable sensing means is moved around a path of the disc in accordance with a second variable to be integrated and responds to the other marker to stop the count. Counting means responsive to the respective sensing means gives a count of marks for each revolution of the disc, and the counts from successive revolutions are added. The integrating device may be used to measure loads on a conveyor belt by driving the disc in synchronism with the belt and moving the movable sensing means proportionally to the weight of the belt and load thereon. Provision is made to take into account the weight of the unloaded belt.

---

This invention relates to integrating devices.

The invention consists in an integrating device comprising a rotating member having marks therearound to give a count and marks for initiating and terminating the count during each rotation, means for driving the rotating member in proportion to one of the variables to be integrated, fixed sensing means for registering the passage of a mark or marks on the rotating member, further sensing means mounted for movement around the path of the rotating member in accordance with a second variable of the integration for registering the passage of a mark or marks on the rotating member and counting means to be actuated from the respective sensing means to give a count of marks for each revolution of the rotating member and means for adding the counts from successive revolutions.

Preferably the rotating member is in the form of a disc.

Conveniently the disc has a circular track with alternate transparent and opaque segments, at a given distance from the centre of the disc and two markers are located along one radial line on the disc, at different distances from the centre of the disc.

Perferably three photoelectric means are provided two these being fixed and the third circumferentially positioned by a signal proportional to the second variable so that as the disc revolves the photocell aligned with the circular track counts segments in the track until the marker aligned with the movable photocell passes said photocell whereupon the counting is inhibited, the counting being recommenced when the other marker passes its photocell, the output from the counting photocell being fed into an electronic counting network.

The output from the counting network can be displayed on a suitable electro-mechanical impulse counter which can, in turn, give direct number display or be recorded on punched cards, magnetic tape or punched tape for feeding into a computer.

The invention will be further described with reference to the accompanying drawings showing an integrating belt weigher incorporating an integrator according to the invention.

FIGURE 1 is a cut-away perspective view of an integrating mechanism according to the invention;

FIGURE 2 is a face view of the divided disc used in the integrating mechanism;

FIGURE 3 is a side elevation of a conveyor belt showing diagrammatically the location and interrelation of the integrating mechanism and associated units; and FIGURE 4 is a more detailed block diagram of the counting circuits of the integrator mechanism.

In accordance with usual practice the strain gauge load cells LC (FIGURE 3) are located on each side of the conveyor belt CB and support a roller or rollers R which in turn supports the belt CB. The instantaneous output of the load cell actuate a well known instant weight indicator WI or servo-balance mechanism to give an instantaneous reading of the weight passing over the part of the belt supported by the roller or rollers. The usual weight indicator does this by means of a pointer which travels over an angle somewhat less than 360°.

The synchro transmitter ST is arranged to be driven by the belt B at a point remote from the load cells over a remote control circuit indicated by the broken line drives the receive synchro RS of the integrator device I and thence to the display counter DC.

It is conveniently arranged that the receive synchro makes one revolution per unit length of the belt passing the synchro transmitter and hence over the roller supported by the load cells, e.g. one revolution per foot length of conveyor passing.

The receive synchro RS via shaft S1 drives a disc D which as shown in FIGURE 2 has a radially divided circular track A at a suitable distance from the outer circumference consisting of short lengths of radii which are opaque and transparent alternately and extending through almost 360° leaving a gap.

Intermediately in the gap there is a short transparent slit B at a greater radius and a short transparent slit C at a smaller radius. A photo-cell counter unit PC1 (FIG 1) is mounted at a fixed position straddling the disc and having a photo-cell and light source PC1a for counting the passage of the alternative opaque and transparent radii of the track A of the disc D and a second photocell and light source PC1b for detecting the inner slit C.

A second photo-cell counter unit PC2 also having a photo-cell and light source straddles the disc in a position aligned with the outer marker slit B and is carried on a radius arm RA attached to the shaft S2 of the weight indicator. The range of movement of the shaft S2 is arranged to be less than one revolution for the range o conveyor belt loads the apparatus is designed to carry The outputs from the photo-cell units PC1 and PC2 are passed into an electronic counting network. Thus the output from photocell/light source unit PC1a is fed via a count input amplifier CIA and pulse shaper PS to a 2-input AND gate 21AG and then to two÷10 frequency dividing circuits in succession and thence to a single shot multivibrator SSMV1 and output drive OD1 to a display counter DC. Therefore for every 100 marks on track A of disc D passing photo-cell PC1a, one pulse is supplied to the add side of the display counter.

This counting continues until marker B passes photo cell/light source unit PC2. The output from this photo cell is fed via a stop input amplifier SIA and inverter amplifier IA1 to a flip-flop FF and thence to the input AND gate 21AG. This stops any further counting until the inhibit signal is removed.

When marker C passes photocell/light source unit PC1b the output signal is passed into a reset input amplifier RIA and inverter amplifier IA2 and thence to the flip-flop circuit FF which in turn removes the inhibit signal allowing counting to continue when marks on track A once again pass photo-cell PC1a.

The displayed count will thus increase by an amount corresponding to the weight per unit length of belt for every unit length of belt passing. Fractions will be stored and added to the next count.

The output from photo-cell PC1b is also fed to a binary flip-flop BFF and hence via a single shot multivibrator SSMV2 and output drive OD2 to the subtract side of the display counter. Therefore for every two revolutions of the disc one pulse will be supplied to the subtract side of the display counter. This is to take care of the weight of the empty belt, as described hereinafter.

In respect of the foregoing description, it may be helpful to point out where, in the literature available to the public at the time this application was filed, a synchro transmitter; a synchro receiver suitable for use at ST and RS; the frequency dividing circuits, weights indicator and the count, stop and reset input amplifier shown in FIG. 4 are disclosed.

A. The unit denoted by CIA (Count Impulse Amplifier) is merely the input amplifier of the "count" channel. The units denoted by SIA (Stop Input Amplifier) and RIA (Reset Input Amplifier) are likewise merely the input amplifiers of the "stop" and "reset" channels.

Consequently, any amplifier of the type suitable for the amplification of signals from a photocell may be utilized in any of the above units. An enormous variety of such amplifiers has been described in the literature. We refer only to:

(1) Photoelectricity, by V. K. Zworykin and E. G. Ramberg, Wiley & Sons Inc., 1949, pp. 227–233.

(2) Photosensitors, by W. Summer, Chapman and Hall, 1954, Chapter 5.

B. The "weight indicator WI or servo-balance mechanism" is, as is indicated above, merely a bridge whose unbalance signal is employed to actuate a servo-motor coupled to an adjustable arm of the bridge in such a manner that the unbalance signal is reduced to zero, i.e. so that the bridge is balanced, the rotation of the servo-motor thereby giving a measure of the unbalance signal. In other words, the unit WI belongs to the class of devices commonly known as automatic potentiometers or self-balancing potentiometers. Again, a large variety of such devices has been described in the literature. We refer simply to:

(1) Automatic Control Handbook, by G. A. T. Burdett as Advisory Editor, Newnes Limited, 1962, Section 13–4.

(2) Electronic Measuring Instruments by E. H. W. Banner, Chapman and Hall, 1958, p. 455.

(3) Electromechanical Components for Servo-mechanisms, McGraw-Hill, 1961, p. 77.

C. Units of the type divided-by-ten are, of course, universally known. The simplest type of such decade counter consists of five series-connected bistable trigger circuits, although innumerable more sophisticated versions are known. We refer to:

(1) The journal "Electronic Engineering," December 1958, pp. 698–701.

(2) British Patent 592,799 (1947).

(3) High Speed Counting Devices, by Engineering Research Associates, McGraw-Hill, 1950, p. 24 and Chapter 3.

D. Concerning the transmit and receive synchros ST and SR respectively, we refer to:

(1) Principles and Practice of Radar, by R. S. H. Boulding, Newnes Limited, 1963, Chapter 21.

(2) Pages 8 and 9 of Introduction of Servo Mechanisms, by A. Porter, New York; John Wiley & Sons Inc., first published Dec. 7, 1950, second edition November 1952, reprinted 1954 and 1957. Figure 4 on page 9 shows the principles of the synchro transmitter and receiver but there referred to as Selsyn- or Magslip-type data transmission system. The actual instruments used were Muirhead 2-inch Magslips A.P. 6550.

The principle of operation of our device is amplified:

First, the angular displacement of arm RA carrying photocell RC2 is substantially proportional to the weight per unit length (the line weight) carried by the belt. Thus, with reference to FIG. 1, where disc D is shown as moving in an anticlockwise direction, when the line weight is near the smallest value of a prescribed range, PC2 will be located just on the far side of the block denoted PC1, and when the line weight is near the maximum value of the prescribed range, then PC2 will be abutting the near side of block PC1.

The three channels shown in FIG. 4 may be designated, reading from top to bottom, as the count channel, the stop (or stop-count, or interrupt-count) channel, and the reset (or start-count, or continue-count) channel.

Consider the situation when slot C has just passed photocell PC1b. The resulting pulse triggers bistable flip-flop FF, the resulting DC potential on lead $a$ of which being such that count pulses (via slots A and photocell PC1a) can now pass through the AND gate 21AG to the dividing circuits, where they are counted/stored.

Count pulses will continue to pass to the counting circuit until slot B passes photocell PC2. This produces a pulse which is fed to the stop channel, which pulse reverses flip-flop FF, with the result that the potential on lead $a$ is changed so that AND circuit 21AG is closed and count pulses are no longer able to reach the counter. No more count pulses reach the counter for the rest of this revolution of disc D; when slot C reaches PC1a again, flip-flop FF is once more reversed and count pulses are again accumulated by the counter.

Thus, during one revolution of disc D, the number of pulses counted is proportional to the angular displacement of arm RA pertaining at that time, i.e. is proportional to the line weight at that time. Thus, the total number of pulses accumulated over a number of revolutions of disc D (when generally the position of arm RA will be varying) will be a direct measure of the total weight carried by the conveyor during these revolutions (i.e. represents the time integral of the weight). In this connection we recall that disc D moves in step with the conveyor, one revolution of disc D corresponding, say, to a one-foot length of the conveyor belt.

The counter accumulates pulses and, in the embodiment shown, produces one output pulse for 100 input pulses. The output pulses are fed to a first terminal of a display device DC. In the embodiment shown a second terminal of the display device is fed with pulses derived from slot C, one such pulse for each two successive pulses produced by photocell PC1b.

As described above, the pulse fed to the display counter DC for each two pulses from photo-cell PC1b is subtracted from the existing count. The purpose of this will now be explained.

In order to overcome fluctuations in empty belt weight due to joints, uneven belt wear, material sticking to the belt, and the like, provision is made for the integrator to add or subtract so that the net gain in weight as shown by the display is zero for a number of complete revolutions of the empty belt.

Thus the circular track is considered to be composed of $(x+y)$ transparent segments where $x$ is the number of segments between the integrator starting point and the mean weight per unit length value for an empty belt and where $y$ is the number of segments between the mean weight per unit length value and the instrument full-scale reading. The angular position of arm RA for the mean weight per unit length of an empty belt is set to coincide with slit number $x$ in the integrator track when the integrator starting-point coincides with slit number zero in the track so that for each revolution of the integrating disc, $x$ slits are counted by the counting photocell between the integrator starting-point and the mean weight per unit length value. This value of $x$ slits is automatically subtracted from the counted total for any one complete revolution of the integrator disc. Thus, with an empty belt, the integrator reading will not change for one complete revolution of the belt if the arm RA has been properly set, thereby indicating the proper setting.

As an example, under zero load conditions (empty belt) it is arranged that say 50 marks are counted by photo-cell PC1a before the inhibit signal is supplied by photo-cell PC2 for each revolution of the disc. Therefore for two disc revolutions 100 marks will be detected by photo-cell PC1a thus registering one unit added to the display; but after two revolutions of the disc, one unit will have been subtracted from the display due to the signal from PC1b. Hence the display will show zero loss or gain. In operation under loaded conditions, the number of marks counted by PC1a will be 50 marks for the unloaded belt plus a number of marks corresponding to the weight of the material on the belt for each revolution of disc D. The total number of marks is divided by a predetermined factor, in the case a factor of 100, to yield the count supplied to the display counter DC. The 50 marks per revolution of disc D, corresponding to the unloaded belt, is a sub-multiple of the division factor, namely ½. The number of revolutions of the disc required to subtract one count from the counted total in the display counter is the corresponding multiple, namely 2. Accordingly, on the average the number of counts subtracted will equal the number of counts added which are attributable to the weight of the unloaded belt.

If the weight of the empty belt changes (e.g. due to it becoming wet or dirty) then the mean position about which the movable photocell PC2 on arm RA oscillates will be, say, mark $x+n$, due to the increased weight of the empty belt running over the rollers. This is corrected by checking the position about which the movable photocell is oscillating when the belt is empty, and then moving it back to the mean position $x$. This may be done by rotating arm RA on shaft S2 through the appropriate angle, or by adjusting a zero set control commonly available in a conventional weight indicator WI to accomplish an equivalent result. This check and correction can be done manually at any required interval. In this way it can be arranged that there is always zero loss or gain in weight display, due to the weight of the unloaded belt. Various modifications may be made within the scope of the invention. Thus the disc marks may be magnetic ones and picked up by magnetic sensing means.

While the invention has been described in its application to an integrating belt weigher it will be understood that it can also be applied to other integrating problems.

We claim:

1. An integrating device for integrating the product of two variables, comprising a rotating disc member having a circular track with alternate transparent and opaque marks therearound at a given distance from the centre of the disc to give a count and two markers located along one radial line on the disc at different distances from the centre of the disc for initiating and terminating the count during each rotation, means for driving the rotating member in proportion to one of the variables to be integrated, first fixed sensing means for registering the passage of the alternate marks on the rotating member, second fixed sensing means for registering the passage of one of said markers for initiating the count, movable sensing means mounted for movement around a path of the rotating member in accordance with a second variable of the integration for registering the passage of the other of said markers for terminating said count, counting means responsive to the respective sensing means to give a count of marks for each revolution of the rotating member, and adding means for adding the counts from successive revolutions.

2. An integrating device as claimed in claim 1 in which the sensing means comprise photocells.

3. An integrating device in accordance with claim 1 for measuring the load carried on a conveyor belt, said rotating member being driven in synchronism with the movement of the belt and the angular movement of said movable sensing means being proportional to the weight of the belt and load thereon, the position of said movable sensing means when the belt is empty corresponding to a predetermined count of said alternate marks, and including subtracting means for subtracting from the counted total a reading equivalent to said predetermined count multiplied by the number of revolutions of said disc.

4. An integrating device according to claim 3 in which said counting means includes means for dividing the number of alternate marks sensed by said first fixed sensing means by a predetermined factor to yield the counts supplied to said adding means, said predetermined count for an empty belt is a sub-multiple of said predetermined factor, and said subtracting means subtracts one count from the counted total for each corresponding multiple number of revolutions of said disc.

References Cited

UNITED STATES PATENTS

| | | | |
|---|---|---|---|
| 2,230,715 | 2/1941 | Cockrell | 250—219 X |
| 2,428,990 | 10/1947 | Rajchman | 235—61.6 |
| 2,803,448 | 8/1957 | Biebel | 250—231 X |
| 3,066,226 | 11/1962 | Lindstrom | 250—223 X |
| 3,096,444 | 7/1963 | Seward | 250—231 |

WALTER STOLWEIN, Primary Examiner

U.S. Cl. X.R.

235—61; 250—236, 237

UNITED STATES PATENT OFFICE
CERTIFICATE OF CORRECTION

Patent No. 3,461,307                              August 12, 1969

Eric John Rusling et al.

It is certified that error appears in the above identified patent and that said Letters Patent are hereby corrected as shown below:

Column 1, line 58, "means are provided two" should read -- means are provided, two of --. Column 2, line 25, "cells over" should read -- cells and over --. Column 4, line 37, "the manner" should read -- the number --.

Signed and sealed this 19th day of May 1970.

(SEAL)
Attest:

Edward M. Fletcher, Jr.                          WILLIAM E. SCHUYLER, JR

Attesting Officer                                      Commissioner of Patents